United States Patent [19]

Sarnecki et al.

[11] 4,367,214

[45] Jan. 4, 1983

[54] MANUFACTURE OF ACICULAR FERRIMAGNETIC IRON OXIDE

[75] Inventors: Wilhelm Sarnecki, Limburgerhof; Laszlo Marosi, Ludwigshafen; Horst Autzen, Freinsheim; Manfred Ohlinger, Frankenthal; Werner Steck, Mutterstadt, all of Fed. Rep. of Germany

[73] Assignee: BASF Aktiengesellschaft, Fed. Rep. of Germany

[21] Appl. No.: 174,105

[22] Filed: Jul. 31, 1980

[30] Foreign Application Priority Data

Sep. 1, 1979 [DE] Fed. Rep. of Germany ....... 2935444

[51] Int. Cl.³ ............................................. C01G 49/06
[52] U.S. Cl. ................. 423/634; 252/62.56; 423/632
[58] Field of Search ................ 423/632–634; 252/62.56

[56] References Cited

U.S. PATENT DOCUMENTS

| | | |
|---|---|---|
| 2,900,236 | 8/1959 | Speed et al. |
| 3,399,142 | 8/1968 | Conley . |
| 3,904,540 | 9/1975 | Bennetch . |
| 4,096,292 | 6/1978 | Fagherazzi et al. ............. 252/62.56 |
| 4,209,412 | 6/1980 | Marcot .......................... 252/62.56 X |

FOREIGN PATENT DOCUMENTS

| | | | |
|---|---|---|---|
| 801352 | 1/1951 | Fed. Rep. of Germany . | |
| 39-5009 | 4/1964 | Japan ................................. | 423/634 |
| 49-43899 | 4/1974 | Japan ................................. | 423/634 |
| 54-122699 | 9/1979 | Japan ................................. | 423/633 |
| 675260 | 2/1949 | United Kingdom . | |

*Primary Examiner*—Jack Cooper
*Attorney, Agent, or Firm*—Keil & Witherspoon

[57] ABSTRACT

A process for the manufacture of acicular ferrimagnetic iron oxide by heating iron(III) oxide or iron(III) oxide hydroxide at 220°–460° C. under a water vapor partial pressure of not less than 30 mbar, reducing the resulting product to magnetite by means of hydrogen and/or CO and/or an organic compound which can decompose in the presence of iron oxide, and then oxidizing the magnetite with an oxygen-containing gas to give acicular ferrimagnetic iron oxide of the formula $FeO_X$, where X is from 1.33 to 1.50.

2 Claims, No Drawings

MANUFACTURE OF ACICULAR FERRIMAGNETIC IRON OXIDE

The present invention relates to a process for the manufacture of acicular ferrimagnetic iron oxide by heating iron(III) oxide or iron(III) oxide hydroxide, reducing the resulting product to magnetite by means of hydrogen and/or CO and/or an organic compound which can decompose in the presence of iron oxide, and then oxidizing the magnetite with an oxygen-containing gas to give acicular ferrimagnetic iron oxide of the formula $FeO_X$, where X is from 1.33 to 1.50.

Acicular ferrimagnetic iron oxides, eg. magnetite and gamma-iron(III) oxide, have long been used extensively as magnetizable materials in the manufacture of magnetic recording media. A large number of processes for the production of the principally used product, gamma-iron(III) oxide, has been disclosed. For example, British Pat. No. 675,260 describes a process for obtaining gamma-iron(III) oxide, wherein acicular alpha-iron oxide hydroxide (goethite) is dehydrated to alpha-iron(III) oxide, the latter is converted to magnetite in a reducing atmosphere at above 300° C. and the magnetite is then oxidized in air at below 450° C., to give acicular gamma-iron(III) oxide. In the course of attempts to improve the crystalline, mechanical and magnetic properties of such materials, the individual stages of this process have frequently been varied, as have the starting materials. Suitable magnetic iron oxides were also produced by the method disclosed in German Pat. No. 801,352, namely by treating non-magnetic iron oxides with salts of short-chain carboxylic acids and then heating the product; the magnetite thus obtained can also be converted to gamma-iron(III) oxide by oxidation at 200°–400° C. Subsequently, U.S. Pat. No. 2,900,236 disclosed that any organic compound which can be decomposed at below 540° C. with little formation of tar and ash may be used to reduce the non-magnetic iron oxides to magnetite. To carry out this reaction, the iron oxide is brought into contact with the gaseous, solid or liquid organic substance and heated at 540°–650° C. The above prior art processes are in some cases carried out in the absence of air, so that the reaction stops at the magnetite stage, and in some cases in the presence of air, whereby the magnetite is oxidized immediately to gamma-iron(III) oxide.

The starting materials for the production of the ferrimagnetic iron oxides are, in general, $\alpha$-FeOOH or $\alpha$-Fe$_2$O$_3$, but also $\delta$-FeOOH (German Published Application DAS No. 1,203,656) and $\delta$-FeOOH (German Laid-Open Application DOS No. 2,212,435) and mixtures of these. It has also been proposed on several occasions that before these iron oxides are processed further they should be heated, in order to increase the coercive force of the final products. However, temperatures of above 400° C. and up to 700° C. proved necessary to achieve this effect. Such high temperatures have the disadvantage that sintering of the small particles takes place. As a result, the acicular shape of the magnetic particles is impaired and hence the magnetic properties of magnetic recording media produced with such particles are adversely effected.

It is an object of the present invention to provide a process for the manufacture of ferrimagnetic iron oxides which gives products which have a high coercive force, but which do not have the disadvantages described above.

We have found that this object is achieved and that acicular ferrimagnetic iron oxides of the formula $FeO_X$, where X is from 1.33 to 1.50, which have the required properties may be manufactured by heating an acicular iron(III) oxide or iron(III) oxide hydroxide, reducing the resulting product to magnetite at from 300+ to 650° C. by means of hydrogen and/or CO and/or an organic compound which can decompose in the presence of iron oxide, and oxidizing the magnetite with an oxygen-containing gas at from 150° to 500° C., if the heating of the acicular iron(III) oxide or iron(III) oxide hydroxide, selected from the group consisting of alpha-iron(III) oxide, gamma-iron(III) oxide, goethite ($\alpha$-FeOOH), lepidocrocite ($\gamma$-FeOOH) and mixtures of these, is carried out at from 220° to 460° C. under a water vapor partial pressure of from 30 to 1013 mbar. The duration of heating may be from 3 minutes to 8 hours, depending on the temperature used, and on the required properties of the product. Longer periods are also possible, but are uneconomical. The novel process may be carried out particularly advantageously if the water vapor partial pressure during heating is from 70 to 1013 mbar.

The acicular iron(III) oxides and iron(III) oxide hydroxides employed as starting materials for the novel process are selected from the group consisting of alpha- and gamma-iron(III) oxides obtained directly by dehydration, alpha- or gamma-iron(III) oxide hydroxides, and mixtures thereof. If the oxide hydroxides are employed, dehydration takes place during heating, giving the corresponding oxides or mixtures of oxides.

The heating of the above materials is carried out in a conventional manner. According to the invention, the temperature used is from 220° to 460° C., and in the case of $\alpha$-FeOOH, advantageously from 270° to 450° C. It is however essential that the water vapor partial pressure in the reaction chamber should be not less than 30 mbar and preferably from 70 to 1013 mbar. This atmosphere containing water vapor is obtained either by directly introducing water or steam into the heating zone or by charging a gas, eg. air or nitrogen, flowing through the heating zone, with steam. If an iron(III) oxide hydroxide is employed in this process step, the requisite water vapor partial pressure may be obtained as a result of the water formed by the dehydration of the oxide hydroxide at above 220° C.

The iron oxides obtained by the above heat treatment are then reduced to magnetite in a conventional manner. For this purpose, the product which has been heated according to the invention is mixed mechanically with a solid or liquid reducing agent, or coated with such a reducing agent in a suitable solution or suspension of the substance, and is then heated at from 300° to 650° C. under an inert gas. The process can also be carried out by reduction with hydrogen and/or CO or a gaseous organic substance, these reducing agents being admixed to an inert gas. All organic substances stated to be suitable in the prior art may be used together with hydrogen, provided they can decompose in the presence of iron oxide at from 300° to 650° C. Advantageously, a higher fatty acid, a derivative thereof, glycerol, an inert gas/alcohol vapor mixture or methane is used.

In developing the novel process, it has been found that the heating and the subsequent reduction can be carried out in a single reaction apparatus. For this purpose, either the particular reducing agent, in the present case hydrogen and/or CO and/or the vapor of an organic substance, is passed over the product to be reduced, after conclusion of the heating step, or, as a further simplification, the heating is carried out in the presence of hydrogen and/or of the vapor of the organic substance which serves to reduce the iron oxide. However, in the last-mentioned embodiment it is necessary that the heating should be carried out at a temperature which lies within the range required according to the invention but is below the temperature at which the reduction of the iron oxides commences. The reduction to the magnetite is carried out thereafter by raising the temperature.

Subsequently, the magnetite obtained as described above is oxidized by means of an oxygen-containing gas, at from 150° to 500° C., to give an acicular magnetic iron oxide of the formula $FeO_X$, where X is from 1.33 to 1.50. In the case of complete oxidation, ie. if X=1.50, gama-iron(III) oxide is formed. The values of X above 1.33 relate to the various berthollides.

The acicular ferrimagnetic iron oxides produced according to the invention, above all gamma-iron(III) oxide, unexpectedly show advantageous properties when used as magnetic materials for the production of magnetic recording media. To produce the magnetic coating mix, the ferrimagnetic iron oxide is dispersed in polymeric binder. Suitable binders for this purpose are conventional compounds, such as homopolymers and copolymers of vinyl monomers, polyurethanes, polyesters and the like. The binder is used as a solution in suitable organic solvent, which may or may not contain other additives. The magnetic dispersion is applied to rigid or flexible bases such as disks, films and cards.

Suprisingly, the acicular ferrigmagnetic iron oxides produced according to the invention, in particular the gamma-iron(III) oxide thus obtainable, differ distinctly from the conventional gamma-iron(III) oxides in having a higher coercive force, and from the highly coercive gamma-iron(III) oxides prepared by conventional high-temperature treatment in having a better acicular shape. These improvements in the magnetic material also manifest themselves very clearly in magnetic recording media produced with the materials.

The Examples which follow illustrate the invention.

The magnetic properties of the iron oxides are measured by means of a conventional vibrating sample magnetometer at a field strength of 100 kA/m. The coercive force ($H_c$) is given in [kA/m], and the specific remanence ($M_r/\delta$) and specific magnetization ($M_m/\delta$) are given in [nT.m$^3$/g]. The tap density d of the sample measured is 1.2 g/cm$^3$, unless stated otherwise. The surface areas ($S_{N2}$) of the various materials at the different process stages are determined by the BET method.

EXAMPLE 1

150 grams of $\gamma$-FeOOH, having a surface area of 28.7 m$^2$/g, are heated for one hour at 350° C. in a rotary evaporator under atmospheric pressure, in a stream of 100 liters of air/h.

The air introduced is passed through boiling water immediately before entering the apparatus, and is as a result saturated with water vapor at 100° C. After having cooled, the product obtained is thoroughly mixed with 2% by weight of stearic acid and is then heated for 30 minutes at 500° C. in a stream of nitrogen. The magnetite thus formed is then oxidized to gama-iron(III) oxide in a stream of air at 250° C. in the course of one hour. The results obtained with this product are shown in Table 1.

COMPARATIVE EXPERIMENT 1

150 grams of $\gamma$-FeOOH having a surface area of 28.7 m$^2$/g are heated for one hour at 350° C. in a rotary evaporator, which is attached to an oil pump. A pressure of 26–30 mbar is maintained during heating by introducing dry air through a capillary. The further processing of the material obtained is carried out as described in Example 1. The results of the measurements are shown in Table 1.

EXAMPLE 2

156 grams of $\gamma$-FeOOH having a surface area of 23.1 m$^2$/g are heated for 8 hours at 250° C. in a rotary evaporator fitted with a reflux condenser, without passing air through the apparatus. As a result of the condensation, in the reflux condenser, of the water eliminated from the iron(III) oxide hydroxide, a water vapor atmosphere (pH$_2$O=1013 mbar) is created in the reaction space. The subsequent reduction to magnetite and oxidation to gamma-iron(III) oxide is carried out as described in Example 1. The results of the measurements are shown in Table 1.

COMPARATIVE EXPERIMENT 2

156 grams of $\gamma$-FeOOH having a surface area of 32.1 m$^2$/g are heated for 8 hours at 250° C. in a rotary evaporator, which is attached to an oil pump. A pressure of 26–30 mbar is maintained during heating by introducing dry air through a capillary. The subsequent reduction and oxidation are carried out as described in Example 2. The results of the measurements are shown in Table 1.

EXAMPLE 3

100 grams of $\gamma$-FeOOH having a surface area of 27.9 m$^2$/g are heated for one hour at 400° C. in a stream of 100 liters of air/h, in a rotating quartz flask The air introduced is passed through boiling water immediately before entering the apparatus, and is as a result saturated with water vapor at 100° C. The resulting iron(III) oxide is then reduced for two hours with hydrogen at 320° C. in a rotary kiln, after which it is oxidized to gamma-iron(III) oxide by means of air at 300° C. in the course of half an hour. The results of the measurements are shown in Table 1.

COMPARATIVE EXPERIMENT 3

100 grams of the $\gamma$-FeOOH employed in Example 3 are heated for one hour at 400° C. in a rotary evaporator connected to an oil pump, whilst introducing pre-dried air through a capillary at such a rate as to give a pressure of 26–30 mbar. The further processing of the resulting iron(III) oxide is carried out as described in Example 3. The results of the measurements are shown in Table 1.

EXAMPLE 4

70 grams of $\alpha$-FeOOH having a surface area of 39 m$^2$/g are heated for 3 hours at 300° C. in a rotary evaporator and at the same time a stream of air which has been saturated with water vapor at 90° C. is passed over the material (pH$_2$O in the reaction space=699 mbar). The resulting iron(III) oxide is then reduced to magnetite by means of hydrogen at 320° C., in the course of 2 hours, in a rotary kiln, after which the magnetite is oxidized to gamma-iron(III) oxide with air at 250° C. in the course of one hour. The results of the measurements are shown in Table 1.

COMPARATIVE EXPERIMENT 4

70 grams of α-FeOOH ($S_{N2}=39$ m²/g) are heated as described in Comparative Experiment 1, and the resulting material is reduced, and the product oxidized, as described in Example 4. The results of the measurements are shown in Table 1.

TABLE 1

| | $S_{N2}$ | $H_c$ | $M_m/\rho$ | $M_r/\rho$ |
|---|---|---|---|---|
| Example 1 | 27.9 | 25.5 | 79 | 44 |
| Comparative Experiment 1 | 28.2 | 21.5 | 75 | 39 |
| Example 2 | 21.7 | 24.8 | 77 | 42 |
| Comparative Experiment 2 | 20.1 | 20.2 | 72 | 37 |
| Example 3 | 14.4 | 25.4 | 77 | 41 |
| Comparative Experiment 3 | 15.4 | 22.3 | 69 | 36 |
| Example 4 | 17.2 | 30.8 | 81 | 46 |
| Comparative Experiment 4 | 16.9 | 26.7 | 78 | 43 |

EXAMPLE 5

Portions, each of 30 grams, of γ-Fe₂O₃, which has a surface area of 41 m²/g and has been produced by dehydrating γ-FeOOH for 2 hours at 250° C. and 26 mbar, are heated, reduced and oxidized, as described in Example 1. However, the water vapor partial pressure of the air during heating differs from portion to portion. The values used, which are shown under Examples 5a to 5d in Table 2, are obtained by varying the temperature of the water through which the air is passed (20°, 40°, 70° and 90° C.). The results of the measurements on the various gamma-iron (III) oxides produced are also shown in Table 2.

COMPARATIVE EXPERIMENT 5

The procedure followed is as described in Example 5, but the air passed over the γ-FeOOH whilst the latter is being heated is pre-dried over silica gel. The results of the measurements are shown in Table 2.

TABLE 2

| | $pH_2O$ | $H_c$ | $M_m/\rho$ | $M_r/\rho$ |
|---|---|---|---|---|
| Example 5a | 23 | 20.5 | 70 | 34 |
| Example 5b | 74 | 21.2 | 74 | 39 |
| Example 5c | 311 | 23.5 | 74 | 39 |
| Example 5d | 699 | 23.6 | 74 | 40 |
| Comparative Experiment 5 | 0 | 20.5 | 72 | 35 |

EXAMPLE 6

50 grams of γ-FeOOH ($S_{N2}=28.7$ m²/g) are heated for one hour at 220° C. in a rotating quartz flask in a stream of hydrogen (100 liters/h) which has been passed through a washbottle containing water at 90° ($pH_2O=699$ mbar).

To reduce the material, the temperature is then raised to 320° and the washbottle containing water is kept at 50° C. After ½ an hour, the powder obtained is oxidized in a stream of air at 250° for one hour. The resulting gamma-iron (III) oxide has the properties shown in Table 3.

COMPARATIVE EXPERIMENT 6

The procedure described in Example 6 is followed, except that heating is carried out at 220° C. in a stream of dry hydrogen, and only after the temperature has been raised to 320° C. is a washbottle containing water at 50° C. introduced into the gas line.

TABLE 3

| | $S_{N2}$ | $H_c$ | $M_m/\rho$ | $M_r/\rho$ |
|---|---|---|---|---|
| Example 6 | 17.7 | 27.4 | 83 | 45 |
| Comparative Experiment 6 | 20.0 | 22.9 | 79 | 42 |

EXAMPLE 7

700 parts of a gamma-iron (III) oxide produced as described in Example 1, 420 parts of a mixture of equal parts of tetrahydrofuran and dioxane, 8.75 parts of lecithin, 8.75 parts of a neutral polyaminoamide salt and 210 parts of a 20% strength solution, in a mixture of equal parts of tetrahydrofuran and dioxane, of a copolymer of 80% of vinyl chloride, 10% of dimethylmaleate and 10% of diethylmaleate are introduced into a tube mill which is filled with 8,000 parts of steel balls of 5 mm diameter. The mixture is dispersed for 40 hours. 1,090 parts of a 10% strength solution, in a mixture of equal parts of tetrahydrofuran and dioxane, of a thermoplastic polyurethane obtained from adipic acid, butane-1,4-diol and 4,4'-diisocyanatodiphenylmethane, and 0.7 part of a polydimethylsiloxane, are then added. After dispersing for a further 5 hours, the magnetic dispersion obtained is filtered under pressure through a filter of 5 μm pore size. A 6 μm thick polyethylene terephthalate film is coated with the magnetic dispersion in the conventional manner by means of a knife coater, and after passing through a magnetic field, the coating is dried at 60°–100° C. It is then calendered by passing the coated film between heated rollers at 80° C. under a nip pressure of 3 kg/cm. The coated film is cut into 3.81 mm wide tapes. The electro-acoustic measurements are carried out in accordance with DIN No. 45,512, page 2, using Standard Tape T 308 S as reference tape. In addition, the coating thickness d in μm, the coercive force $H_c$ in kA/m, and the remanence $M_r$ and saturation magnetization $M_m$ in mT are determined. The results of the measurements are shown in Table 4.

COMPARATIVE EXPERIMENT 7

The procedure described in Example 7 is followed, except that the magnetic material employed is prepared in accordance with Comparative Experiment 1. The results of the measurements are shown in Table 4.

TABLE 4

| | d | $H_c$ | $M_m$ | $M_r$ | $A_T$[1] | $A_H$[2] in (dB) | $K_O$[3] |
|---|---|---|---|---|---|---|---|
| Example 7 | 4.3 | 26.1 | 170 | 147 | −2.1 | +0.9 | −6 |
| Comparative Experiment 7 | 4.9 | 22.7 | 157 | 133 | −2.3 | −0.2 | −11 |

[1] $A_T$ = maximum output at long wavelengths
[2] $A_H$ = maximum output at short wavelengths
[3] $K_O$ = signal to print-through ratio

EXAMPLE 8

Portions, each of 33 grams, of γ-FeOOH having a surface area of 28.7 m²/g are heated, reduced and oxidized, as described in Example 1. However, the water vapor partial pressure in the air used during heating differs. The values used, which are shown under Experiments 8a to c in Table 6, are obtained by varying the temperature of the water through which the air is passed before entering the apparatus (25° C., 50° C. and 75° C.). In Experiment d, saturated steam at 100° C. was introduced instead of air.

The results of the measurements on the resulting γ-Fe$_2$O$_3$ samples are shown in Table 6.

COMPARATIVE EXPERIMENT 8

The procedure followed is as described in Examples 8a to c except that the air introduced during heating is pre-dried over silica gel.

The results of the measurements are shown in Table 6.

TABLE 6

| Experiment | pH$_2$O [mb] | H$_c$ | M$_m$/ρ | M$_r$/ρ |
|---|---|---|---|---|
| 8a | 32 | 21.6 | 72 | 35 |
| 8b | 123 | 23.0 | 74 | 37 |
| 8c | 384 | 23.8 | 74 | 37 |
| 8d | 1013 | 24.2 | 73 | 37 |
| Comparative Experiment 8 | — | 20.8 | 72 | 35 |

EXAMPLE 9

200 grams of γ-FeOOH having a surface area of 29.5 m$^2$/g are heated for 1 hour at 300° C. whilst maintaining a water vapor pressure of 1013 mbar by the method described in Example 2. The product obtained is reduced by heating it for 30 minutes in a stream of CO at 250° C. The titrimetrically determined iron(II) content, after this treatment, is 24.2%. The material obtained is divided into 4 equal parts.

Sample a is not treated further.

Sample b is oxidized for 10 minutes in a 1:1 mixture of air and nitrogen, whilst being heated at 150° C.

Sample c is oxidized for 45 minutes in a 1:10 mixture of air and nitrogen, at 150° C.

Sample d is oxidized for 30 minutes in air at 250° C.

The results of the measurements are shown in Table 7.

COMPARATIVE EXPERIMENT 9

200 grams of γ-FeOOH, having a surface area of 29.5 m$^2$/g, are heated for 1 hour at 300° C., using the method described in Comparative Experiment 2. The reduction and oxidation are carried out as described in Example 9.

The results of the measurements are shown in Table 7.

TABLE 7

| Sample | Fe:O | H$_c$ | M$_m$/ρ | M$_r$/ρ |
|---|---|---|---|---|
| 9a | 1:1.33 | 20.3 | 80 | 40 |
| 9b | 1:1.41 | 24.0 | 73 | 40 |
| 9c | 1:1.44 | 26.3 | 78 | 45 |
| 9d | 1:1.50 | 22 | 82 | 44 |
| Comparative sample 9a | 1:1.33 | 16.6 | 64 | 29 |
| Comparative sample 9b | 1:1.42 | 18.7 | 69 | 36 |
| Comparative sample 9c | 1:1.45 | 20.2 | 75 | 40 |
| Comparative sample 9d | 1:1.50 | 17.3 | 73 | 38 |

EXAMPLE 10

35 grams of a mixture of γ-FeOOH with 16% of α-FeOOH, having a surface area of 21.7 m$^2$/g, are heated for 1 hour at 350° C. in a rotating tube open at both ends. The water eliminated gradually escapes as steam, so that in the course of the reaction the water vapor pressure in the reaction space drops from 1013 mbar to 30 mbar.

The product obtained is reduced and oxidized as described in Example 1, and after these treatments has the following properties: S$_{N2}$=22.0 m$^2$/g; H$_c$=24.7; M$_m$/δ=76, M$_r$/δ=41.

COMPARATIVE EXPERIMENT 10

35 grams of the mixture specified in Example 10 are treated as described there, except that heating is carried out at 350° C. under 26–30 mbar, as described in Comparative Example 3. The product has the following properties: S$_{N2}$=23.8 m$^2$/g; H$_c$=21.0; M$_m$/δ=74; M$_r$/δ=38.

EXAMPLE 11

175 grams of α-FeOOH are dehydrated at 300° C. under 26–30 mbar. The α-Fe$_2$O$_3$ thus obtained is divided into 2 samples.

The first sample is heated for 1 hour at 300° C. in a rotating flask, the water vapor pressure being brought to 1013 mbar by introducing steam into the reaction space.

The reduction and oxidation are carried out as described in Example 10. The powder obtained has the following properties: H$_c$=21.9; M$_m$/δ=76; M$_r$/δ=40.

COMPARATIVE EXPERIMENT 11

The second α-Fe$_2$O$_3$ sample prepared in Example 11 is treated as described there, except that it is heated in a stream of nitrogen at 300° C. The product has the following properties: H$_c$=19.3; M$_m$/δ=69; M$_r$/δ=38.

EXAMPLE 12

30 grams of γ-FeOOH having a surface area of 29.5 m$^2$/g were heated as rapidly as possible in a rotating quartz flask in a preheated furnace, whilst maintaining a water vapor pressure of 1013 mbar in the reaction space by means of a reflux condenser, as described in Example 2. The temperature reaches 220° C. after 2 minutes and 460° C. after a further 3 minutes.

The flask is then cooled rapidly and the reaction product is reduced with 4% by weight of stearic acid, as described in Example 1, after which it is oxidized with air. The product has the following properties: H$_c$=25.4; M$_m$/δ=75; M$_r$/δ=42.

COMPARATIVE EXPERIMENT 12

30 grams of γ-FeOOH having a surface area of 29.5 m$^2$/g are treated as described in Example 12, except that the material is heated in a stream of air which has been pre-dried by passing it over silica gel. The product has the following properties: H$_c$=24.7; M$_m$/δ=75; M$_r$/δ=41.

We claim:

1. A process for the manufacture of acicular ferrimagnetic iron oxide wherein acicular iron (III) oxide or iron (III) oxide hydroxide selected from the group consisting of alpha-iron (III) oxide, gamma-iron (III) oxide, goethite (α-FeOOH), lepidocrocite (γ-FeOOH) and mixtures thereof is heated in a heating zone at a temperature of from 220° to 460° C. under a water vapor partial pressure of from 70 to 1013 mbar for from 0.05 to 8 hours, said water vapor partial pressure being effected in the heating zone by directly introducing water or steam into the heating zone or by passing gas charged with steam through the heating zone, reducing the resulting product in a subsequent step to magnetite at from 300° to 650° C. by means of hydrogen and/or CO and/or an organic compound which can decompose in the presence of iron oxide and oxidizing the magnetite with an oxygen-containing gas at from 150° to 500° C. to give acicular ferrimagnetic iron oxide of the formula FeO$_x$, where x is from 1.33 to 1.50.

2. The process of claim 1, wherein the heating of the acicular iron (III) oxide or iron (III) oxide hydroxide under said water vapor partial pressure is carried out in an atmosphere of hydrogen and/or an atmosphere of the vapor of said organic compound which can decompose in the presence of iron oxide, at above 220° C., but below the temperature at which the reduction of the iron oxide to magnetite commences.

* * * * *